(12) United States Patent
Matze

(10) Patent No.: US 7,908,473 B2
(45) Date of Patent: Mar. 15, 2011

(54) SYSTEM FOR STORING ENCRYPTED DATA BY SUB-ADDRESS

(75) Inventor: John E. G. Matze, Poway, CA (US)

(73) Assignee: Exar Corporation, Fremont, CA (US)

(*) Notice: Subject to any disclaimer, the term of this patent is extended or adjusted under 35 U.S.C. 154(b) by 970 days.

(21) Appl. No.: 11/750,836

(22) Filed: May 18, 2007

(65) Prior Publication Data
US 2008/0288772 A1 Nov. 20, 2008

(51) Int. Cl.
*H04L 29/08* (2006.01)

(52) U.S. Cl. ........ 713/151; 713/152; 713/153; 713/160; 709/203; 709/213; 709/214; 709/215; 709/217; 709/229; 719/312; 719/326

(58) Field of Classification Search .................. None
See application file for complete search history.

(56) References Cited

U.S. PATENT DOCUMENTS

| | | | |
|---|---|---|---|
| 5,706,502 A | 1/1998 | Foley et al. | |
| 5,727,129 A | 3/1998 | Barrett et al. | |
| 5,761,663 A | 6/1998 | Lagarde et al. | |
| 5,768,528 A | 6/1998 | Stumm | |
| 5,832,522 A | 11/1998 | Blickenstaff et al. | |
| 6,332,025 B2 | 12/2001 | Takahashi et al. | |
| 6,895,461 B1* | 5/2005 | Thompson | 710/305 |
| 7,325,075 B1* | 1/2008 | Chiu et al. | 709/245 |
| 2003/0115447 A1* | 6/2003 | Pham et al. | 713/153 |
| 2004/0030770 A1* | 2/2004 | Pandya | 709/223 |
| 2005/0013441 A1 | 1/2005 | Klein | |
| 2005/0172199 A1* | 8/2005 | Miller et al. | 714/749 |
| 2006/0069926 A1 | 3/2006 | Ginter et al. | |

FOREIGN PATENT DOCUMENTS

EP 1328104 A2 7/2003

* cited by examiner

*Primary Examiner* — Taghi T Arani
*Assistant Examiner* — Amir Mehrmanesh
(74) *Attorney, Agent, or Firm* — Nydegger & Associates

(57) ABSTRACT

A system and method for storing encrypted electronic data using a transmission Control Protocol (TCP), requires leaving both the header and the first 48 bytes of the "0" data packet in the data area of the TCP format in clear text. Consequently, the data can be routed to a main address (storage facility), and then to a sub-address (storage device) for storage. A single compression/encryption operation can be accomplished, before storage, at the host (server), the network switch, or the final storage device.

9 Claims, 1 Drawing Sheet

SYSTEM FOR STORING ENCRYPTED DATA BY SUB-ADDRESS

FIELD OF THE INVENTION

The present invention pertains generally to systems and methods for storing encrypted electronic data. More particularly, the present invention pertains to systems and methods for transferring electronic data through a sequence of addresses for final storage. The present invention is particularly, but not exclusively, useful as a system and method for transferring electronic data wherein all sequential addresses remain in clear text.

BACKGROUND OF THE INVENTION

Computer systems typically have a limited, finite storage capacity on the site where they are installed and used. Invariably, with time, the system gets over-loaded and this capacity becomes operationally insufficient. Nevertheless, it often happens that the electronic data generated by a computer system has archival value and cannot be casually discarded. Moreover, for security reasons, or for compliance with good business practices, it may be desirable to remove such electronic data from a host server at an operating location, and place it into secure storage. In such cases it is often preferable to place the data into long term, non-temporary storage at an off-site storage facility. If so, it is important the electronic data be moved directly from the user site to a storage device at the storage facility, quickly and conveniently. A well-known Transmission Control Protocol (TCP) is typically used for this purpose.

In accordance with TCP, a stream of electronic data (i.e. a data file) that is to be transferred into storage from a host server is broken down into an "x+1" number of data packets. These data packets are then numbered from "0" to "x" and, in toto, include 32 K bytes of data. Collectively, these data packets are referred to as the "data area." TCP, however, also requires the use of a "header." In use, this header precedes the first data packet, and includes the address of the storage facility where the data is to be sent. TCP, however, provides for only two addresses in the header. These are: 1) the source address, and 2) the destination address. Also, whenever it is desirable to encrypt the electronic data for storage, as is most often the case, the header must remain in clear text. It cannot be encrypted. This is so in order to reveal the destination address of the encrypted electronic data (data file) in the header, as it is being transferred into storage.

It happens that most data storage facilities will serve several customers, and will thus have several different storage devices. Indeed, such facilities may even dedicate specific storage devices to particular customers. In such cases, when a data file arrives at a storage facility, additional routing to a particular storage device is required. As indicated above, the header of a TCP transmission does not provide for routing beyond the main address (i.e. destination address) of the storage facility. In order to handle this situation, it has been the practice to place the sub-address of a particular storage device in the first 48 bytes of the "0" data packet in the data area of the TCP protocol. Typically, this is done using the so-called ISCSI protocol. Thus, when an encrypted data area has arrived at a storage facility, the "0" data packet in the data area has required decryption in order to determine the final destination of the storage device where the data is to be stored.

In light of the above, it is an object of the present invention to provide a method and system for transferring encrypted electronic data from a host server, via the main address of a storage facility, to a final sub-address of a storage device, wherein the sub-address of the storage device in the data area of a TCP protocol remains in clear text. Another object of the present invention is to provide a method and system for transferring encrypted electronic data wherein the encryption/decryption functions are minimized. Still another object of the present invention is to provide a method and system for transferring encrypted electronic data that is easy to use, simple to implement and comparatively cost effective.

SUMMARY OF THE INVENTION

In accordance with the present invention, a system and method for storing an encrypted data file at a specific storage device in a particular storage facility is provided. For the present invention, this requires transferring the data file to a main address (storage facility), and then routing the data file to a sub-address (storage device) for storage. Importantly, this is done while avoiding encryption of both the main address of the storage facility, and the sub-address of the storage device.

According to a standard Transmission Control Protocol (TCP), an electronic data file is formatted to have a header that is followed by a data area. Typically, when the data file needs to be encrypted, only the data area is encrypted. The header, which includes routing instructions to the main address of the storage facility, is not encrypted and remains in clear text. On the other hand, the sub-address of the final storage device is placed in the encrypted data area. Importantly, the sub-address of a final storage device is typically found in a 48 byte ISCSI that is at the beginning of the "0" data packet in the data area of the TCP format.

In operation, a data file that is to be placed in storage is compressed/encrypted in any manner well known in the pertinent art, such as by the use of a commercially available chip that is manufactured by HIFN. This can be done either at the host (server), the network switch, or the final storage device.

In accordance with normal procedures, the TCP header of the file is not encrypted. For the present invention, the 48 bytes of the ISCSI, which are at the start of the first data packet and which include the sub-address of the final storage device, are also not encrypted. Instead, both the main address (storage facility) and the sub-address (storage device) remain in clear text and are always available for use in transferring a data file to its intended destination. Importantly, for this transfer, only one compress/encrypt operation is required before the data file is placed in storage. Similarly, only one decrypt/decompress operation is required when the data file is recovered from storage.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
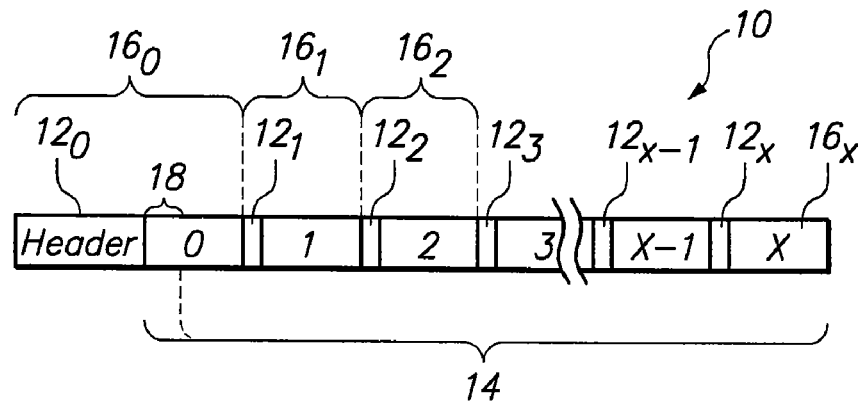
FIG. 1 is a schematic drawing of an electronic data file for use with the present invention.

Referring initially to FIG. 1, an electronic data file in accordance with the present invention is shown and is generally designated 10. In accordance with a standard Transmission Control Protocol (TCP), the data file 10 includes a plurality of data packets 16 and, as shown, each data packet 16 has its own header 12. For identification purposes, the data packets 16 are sequentially numbered from "0" to "x". Collectively, a portion of the first data packet $16_0$ and all of the subsequent data packets $16_1$ through $16_x$ constitute a 32 K data area 14. As also shown in FIG. 1, the "0" data packet $16_0$ has a "48 byte" portion 18 that immediately follows its header $12_0$.

Figure 2:
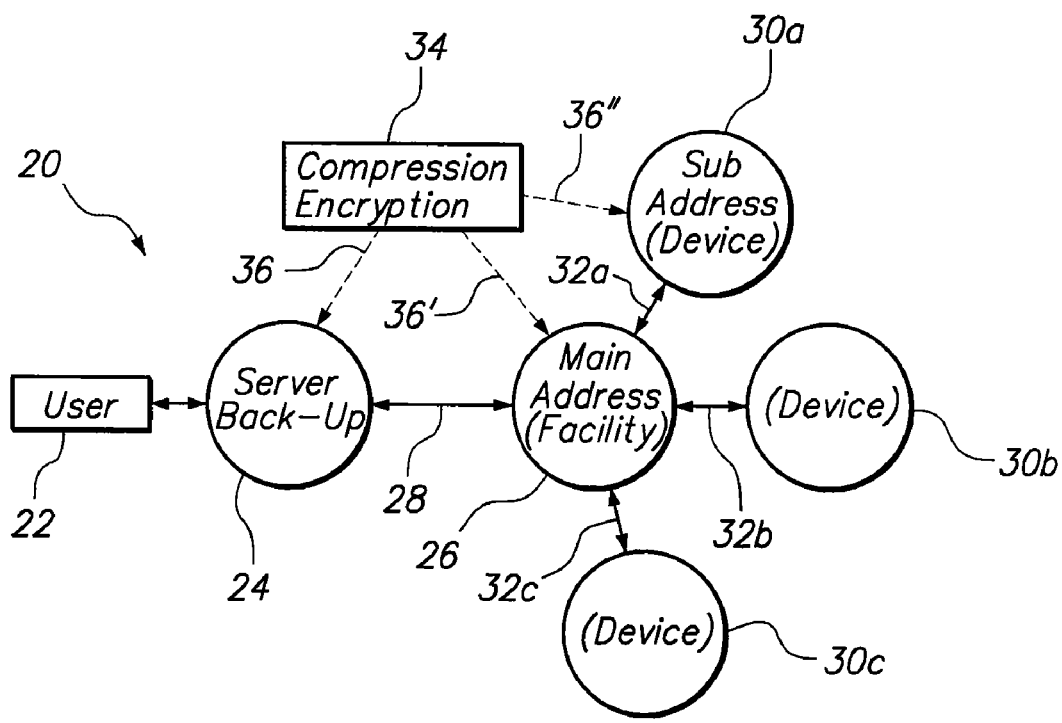
FIG. 2 is a schematic drawing of a data transmission routing system used by the present invention.

In FIG. 2, a system, generally designated 20, is shown wherein a user 22 has control over a back-up server 24. As envisioned by the present invention, electronic data files 10 that are generated routinely or periodically by the user 22, will be temporarily held on the back-up server 24. Eventually, however, the data file 10 will need to be securely stored at a long-term, non-temporary storage facility 26. To do this, the back-up server 24 is somehow connected to a storage facility 26 via a connection 28. Importantly, to ensure this communication connection is effective, the storage facility 26 will have a specific main address of a type and format well known in the pertinent art. Importantly, the data file 10 needs to be sent to this main address.

Still referring to FIG. 2, it will be seen that different storage devices 30 will be associated with the storage facility 26. By way of example, the storage devices 30a, 30b and 30c are shown in FIG. 2 and are each respectively connected to the storage facility 26 via lines 32a, 32b and 32c. For purposes of the present invention each storage device 30 may be of any type well known in the pertinent art, such as a library, a disk, a tape or a DVD. In any event, each storage device 30 will have a specific sub-address. For example, consider the storage device 30a. If the storage device 30a is to be used, the user 22 will need to first send the appropriate data file 10 from the back-up server 24 via connection 28 to the main address of the storage facility 26. From there, the data file 10 will then be sent via line 32a to the sub-address of the storage device 30a.

As indicated above, it is typical, and most likely desirable, for the data file 10 to be compressed and encrypted for its storage on a storage device 30. For the present invention, this is done by a device 34 in a manner well known in the pertinent art, such as by the use of a commercially available chip manufactured by HIFN. Further, as indicated by the dashed lines 36, 36' and 36" in FIG. 2 the compression/encryption of the data file 10 can be selectively accomplished either at the server 24, at the storage facility 26 (network switch), or at a storage device 30a,b,c.

In operation, the data file 10 is prepared. Specifically, the main address of the storage facility 26 is placed in the header $12_0$ as required by TCP. The sub-address of the particular storage device 30 where the data file 10 is to be stored is placed in the portion 18 of the "0" data packet $16_0$. Exclusive of the portion 18 of the "0" data packet $16_0$, the data area 14 of the data file 10 is then compressed and encrypted by the device 34. As disclosed above, this compression/encryption can be done either at the server 24, at the storage facility 26 (network switch), or at a storage device 30a, b or c. Only one compression/encryption function is required, and conversely, when the data file 10 is to be retrieved and removed from the storage device 30, only one decryption/decompression function will be required. An important aspect of the present invention is that, regardless where the data file 10 is moved, the main address of the storage facility 26 in the header 12, and the sub-address of the storage device 30 in the portion 18 of the data area 14, are never encrypted and always remain in clear text.

While the particular System for Storing Encrypted Data by Sub-Address as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for transferring encrypted electronic data from a host server, via a main address of a storage facility, to a final sub-address of a storage device, the method comprising the steps of:
   identifying a header portion and a data area for the electronic data being transferred, wherein the header portion includes the main address of the storage facility;
   dividing the data area into a first part and a second part, wherein the sub-address of the storage device is in the first part;
   encrypting the second part of the data area;
   transferring the electronic data, via the main address, to the sub-address of the storage device;
   wherein the header portion and data area are established in accordance with a Transmission Control Protocol (TCP);
   wherein the data area includes an "x+1" number of data packets, sequentially numbered from "0" through "x", and wherein the first part of the data area is in the "0" data packet; and
   wherein the first part of the data area is structured in accordance with ISCSI protocol and comprises the first 48 bytes of the "0" data packet.

2. A method as recited in claim 1 wherein the header and the first part of the data area are transferred to the storage facility, and to the storage device in clear text.

3. A method as recited in claim 1 wherein the encrypting step is accomplished at the storage facility.

4. A method as recited in claim 1 wherein the encrypting step is accomplished at the storage device.

5. A method for storing electronic data to a storage device, wherein the electronic data is formatted in accordance with a Transmission Control Protocol (TCP) and has a header with a main address and a data area, the method comprising the steps of:
   dividing the data area into a first part and a second part, wherein the sub-address of the storage device is in the first part;
   encrypting the second part of the data area;
   transferring the electronic data to a main address of a storage facility;
   routing the electronic data from the main address of the storage facility to a sub-address of the storage device for storage;
   wherein the data area includes an "x+1" number of data packets, sequentially numbered from "0" through "x", and wherein the first part of the data area is in the "0" data packet; and
   wherein the first part of the data area is structured in accordance with ISCSI protocol and comprises the first 48 bytes of the "0" data packet.

6. A method as recited in claim 5 wherein the encrypting step is accomplished after the transferring step.

7. A method as recited in claim 5 wherein the header and the first part of the data area are transferred to the storage facility, and to the storage device in clear text.

8. A method as recited in claim 5 wherein the encrypting step is accomplished at the storage facility.

9. A method as recited in claim 5 wherein the encrypting step is accomplished at the storage device.

* * * * *